US012591454B2

(12) United States Patent
Uhrig et al.

(10) Patent No.: US 12,591,454 B2
(45) Date of Patent: Mar. 31, 2026

(54) PROCESSING DEVICE AND METHOD FOR DISTRIBUTING DATA TO A PLURALITY OF PROCESSING UNITS

(71) Applicant: Airbus (S.A.S.), Blagnac (FR)

(72) Inventors: Sascha Uhrig, Taufkirchen (DE); Johannes Freitag, Taufkirchen (DE)

(73) Assignee: Airbus (S.A.S.), Blagnac (FR)

( * ) Notice: Subject to any disclaimer, the term of this patent is extended or adjusted under 35 U.S.C. 154(b) by 693 days.

(21) Appl. No.: 18/067,792

(22) Filed: Dec. 19, 2022

(65) Prior Publication Data

US 2023/0195518 A1     Jun. 22, 2023

(30) Foreign Application Priority Data

Dec. 20, 2021   (EP) ..................................... 21215997

(51) Int. Cl.
*G06F 9/48*       (2006.01)
*G06F 9/38*       (2018.01)

(52) U.S. Cl.
CPC .......... *G06F 9/4881* (2013.01); *G06F 9/3877* (2013.01)

(58) Field of Classification Search
CPC .............................. G06F 9/4881; G06F 9/3877
See application file for complete search history.

(56) References Cited

U.S. PATENT DOCUMENTS

| | | | |
|---|---|---|---|
| 8,997,109 B2 * | 3/2015 | Lee ....................... | G06F 9/5038 |
| | | | 718/107 |
| 10,269,088 B2 * | 4/2019 | Ray ....................... | G06F 9/4831 |
| 2020/0043123 A1 | 2/2020 | Dash et al. | |

FOREIGN PATENT DOCUMENTS

WO       WO 00/036487 A2     6/2000

OTHER PUBLICATIONS

European Search Report for Application No. 21215997 dated May 30, 2022.

* cited by examiner

*Primary Examiner* — Wissam Rashid
(74) *Attorney, Agent, or Firm* — KDW Firm PLLC

(57)           ABSTRACT
A processing device for parallel computing and a corresponding method include processing units, a scheduler module, a first common data transmission element, and a first input interface. The first input interface is configured to receive a continuous first data stream and transmit the first data stream via the first common transmission element. Each of the processing units is connected to the first common transmission element and configured to receive data transmitted via the first common transmission element. The scheduler module is in electronic communication with each of the processing units and configured to assign parts of the first data stream to each of the processing units for simultaneous processing. Each of the processing units is configured to monitor the complete first data stream, select the parts of the first data stream assigned by the scheduler module, and perform processing operations on the selected parts of the first data stream.

15 Claims, 3 Drawing Sheets

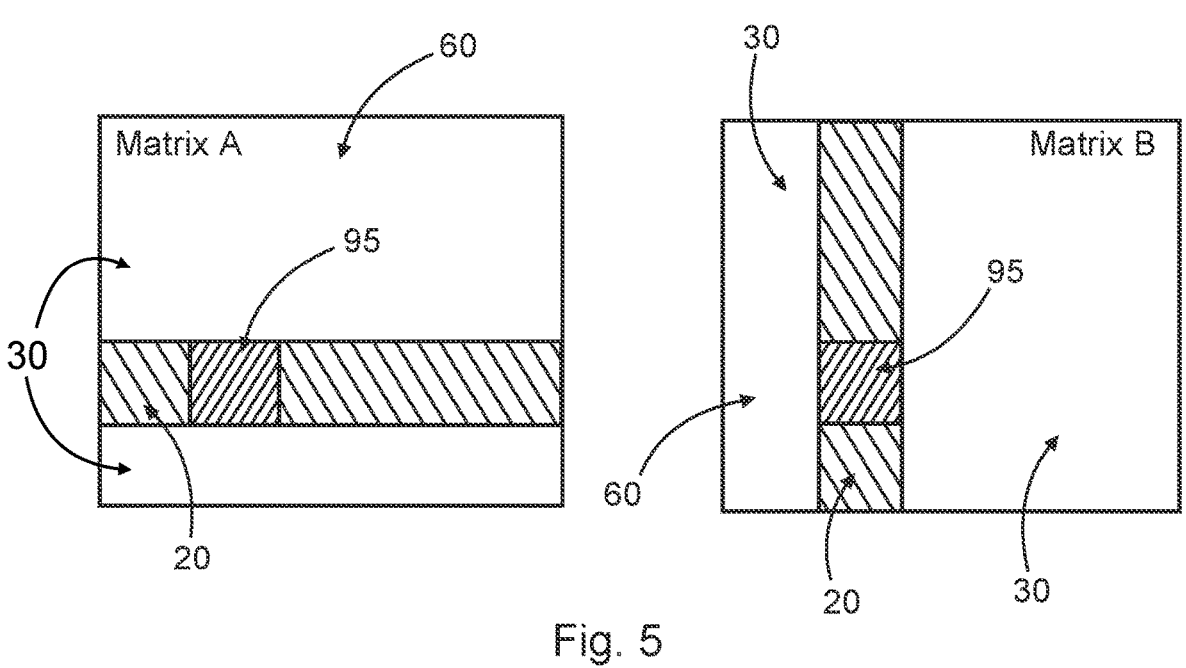
Fig. 5
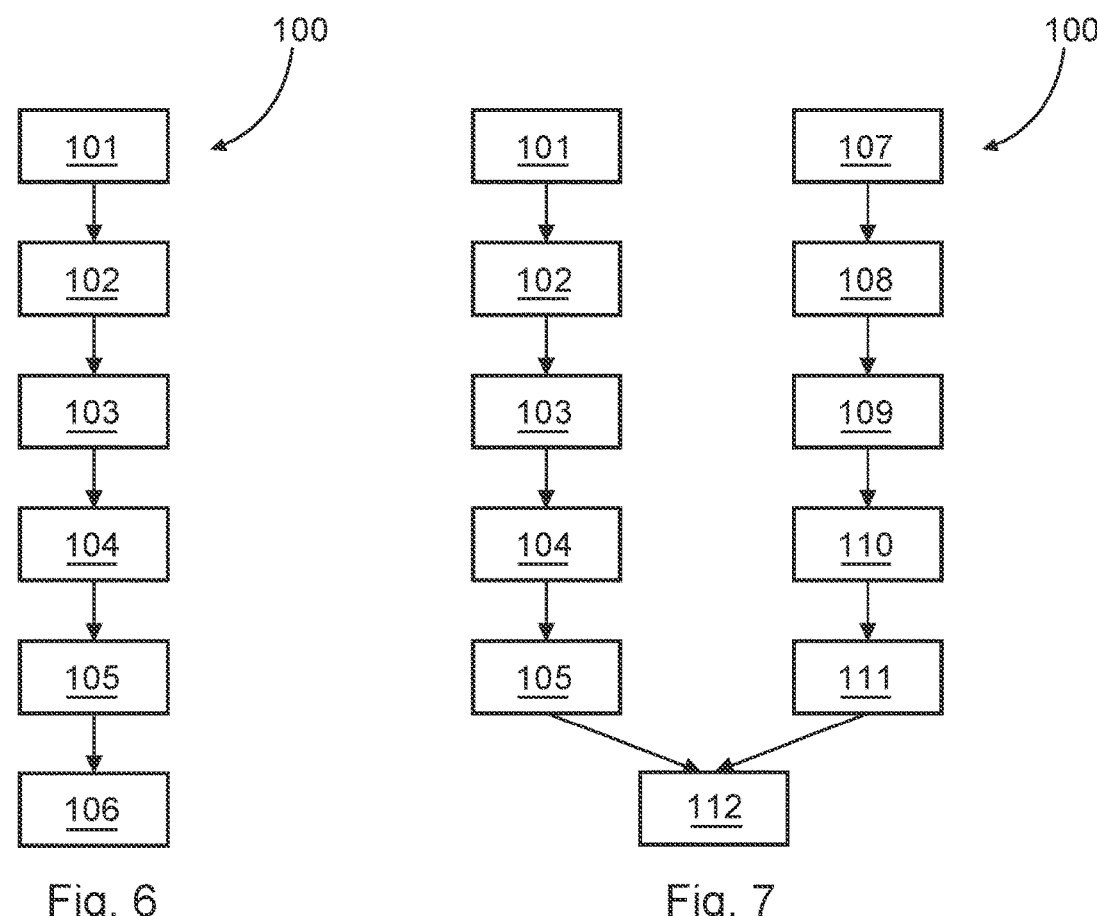
Fig. 6                                    Fig. 7

PROCESSING DEVICE AND METHOD FOR DISTRIBUTING DATA TO A PLURALITY OF PROCESSING UNITS

TECHNICAL FIELD

The disclosure relates to embedded computing for stream-based parallel applications. In particular, the disclosure relates to a processing device for parallel computing and to a method for distributing data to a plurality of processing units.

BACKGROUND

In processing applications with data streaming requirements, for example for image processing in airborne and space applications, oftentimes parallel computing of the data is used in order to achieve reasonable performance. In such parallel computing applications, multiple processing units in parallel work on individual parts of the data to be processed, such as on image data or any other large data sets that needs to be processed within a certain time limit. Thereby, the data typically is stored in a shared memory of the processing system, the individual processing units access these data, and each processing unit performs processing operations on distinct parts of the data (data windows). However, for many applications, it is necessary for at least some of the processing units to work on overlapping data windows, so that multiple processing units perform computation operations partly on the same data. This means that some of the data must be read out by multiple processing units form the shared main memory, leading to an increased amount of memory accesses, time delay due to exclusive memory access, and increased network traffic and, therefore, computational overhead. Moreover, the complete data set must be stored in the shared memory beforehand.

SUMMARY

It is an objective to reduce computational overhead and increase performance in parallel computing applications. This objective is solved by the subject matter herein.

A processing device and a method for distributing data to a plurality of processing units are disclosed herein. Further developments can be derived from the description herein.

Many of the features described with reference to the processing device may be implemented as method steps, or vice versa. Therefore, the description provided in the context of the processing device applies in an analogous manner also to a method. In particular, the functions of the processing device and of its components may be implemented as method steps of the method and the method steps may be implemented as functions of the processing device.

According to a first aspect, a processing device for parallel computing is provided. The processing device comprises a plurality of processing units, a scheduler module, a first common data transmission element and a first input interface. The first input interface is configured to receive a continuous first data stream and to transmit the first data stream via the first common transmission element. Each of the processing units is connected to the first common transmission element and configured to receive data transmitted via the first common transmission element. The scheduler module is in electronic communication with each of the processing units. The scheduler module is configured to assign parts of the first data stream to the processing units for simultaneous processing. Each of the processing units is configured to monitor the complete first data stream, to select the parts of the first data stream assigned by the scheduler module and to perform processing operations on the selected parts of the first data stream.

The processing device may, for example, be (or may be an integrated part of) a regular central processing unit (CPU), a graphics processing unit (GPU), a network on chip (NoC), such as is used on a system on chip (SoC) or any other network-based communication system or subsystem. Therefore, the processing device may be implemented on an integrated circuit (such as on a microchip) or between distinct network devices, such as in regular network communication between computers, e.g., via an ethernet network, a CAN interface, or any other suitable network. The processing device may also be a group of distributed multiple processing units.

The processing units may be distinct processing elements which are configured to perform any type of processing or computing operation. In NoC, CPU, GPU or similar applications, the processing units may, for example, be different processor cores, which cooperate to perform processing operations assigned to the chip. However, in regular network applications, such as Ethernet networks, the processing units may also be standard network computers which are interconnected and can exchange data via the Ethernet. The processing units may also comprise memory elements, such as buffers or cache memories, in order to buffer data to be processed by the corresponding processing unit or to hold the data on which operations are executed. Such cache memories may be, for example and without limitation, the L1, L2 and L3 cache of a CPU.

The first input interface may be any interface suitable for providing data to the processing device. For example, in NoC or similar applications, the first input interface may be any interface which is configured to receive data from outside the chip for processing by the chip. In other, regular network applications, such as when multiple computers are used as processing units, the input interface may, for example, be an access point (such as a wireless access point in WLAN applications or a gateway machine in a LAN) or other suitable device, which can be used to broadcast or stream data to the devices connected to the network, so that every processing unit can access the data stream. However, this enumeration is only exemplary in nature and any interface that can be used to provide data to the processing device may be used.

The first common transmission element is configured to conduct or to transmit a data stream, such as the first data stream, received by the first input interface to the processing units. For this, each of the processing units is connected to the first common transmission element and can receive data conducted or transmitted via or by the first common transmission element. In microchip applications, such as in NoC, CPU or GPU applications, the first common transmission element may, for example, be an internal data bus of the chip to which each processing core is connected and can receive data from. However, the term "conducting" does not necessarily require that an electrical current is conducted via a physical conductor. In regular networking applications such as in Ethernet networks, for example, the network itself may act as the first common transmission element and may "conduct" the data stream in the sense that the first data stream is made accessible to the processing units via the network.

The first data stream carries data to be processed by the processing device or rather by the processing units of the processing device. For example, the first data stream may comprise streamed image or video data. In general, when used herein, the term "image data" also does comprise video data. However, the first data stream may also comprise any other type of streamed data which is to be processed in parallel by the processing units. In particular, the first data stream may be package-based (such as regular IP packages) or non-package-based. It is noted that "processed in parallel" does not require that all processing units process the entire data stream at the same time. More particularly, the data stream is split in a plurality of parts which are assigned to the processing units and each part is processed by one processing unit exclusively while multiple processing units process multiple parts (each processing unit at least one part) at the same time.

The scheduler module is in communication with each of the plurality of processing units and acts as a kind of workload distributor. However, the scheduler module may also be an integrated part of each of the processing units, for example in that each of the processing units is preprogrammed to access certain parts of the data stream. Therefore, the schedular module is to be understood in an abstract way, either as a distinct (hardware) module within or outside the processing device or within each of the processing units, or as software solution (software module) within the processing device or within each of the processing units, that provides the functionalities described herein. When described as being in communication or in electronic communication, internal communication, for example by a software layer within the processing device or each of the processing units with the processing units is also covered. The scheduler module assigns distinct parts of the data stream to distinct processing units for processing. For example, if the first data stream comprises image data that is to be processed, the scheduler module may assigns certain areas in each of the frames of the image data to different processing units, so that each of the plurality of processing units processes the assigned areas of the image frames. In order to do so, the scheduler module may communicate the assigned parts of the data stream (which correspond to an area of the image frame) to each of the processing units, respectively. For this, the scheduler module communicates information to the processing units that can be used by the processing unit to identify the respective parts of the data stream. Therefore, each processing unit knows beforehand, i.e., before the data stream starts to be transmitted, which part of the data stream is to be processed by the corresponding processing unit. In microchip applications, the scheduler module may be an integrated part of the chip or may be an external device or unit in communication with the chip. The scheduler module may also be a software application that is executed by the processing device, or, as described above, may be part of each of the processing units. In regular networking applications, such as Ethernet, the scheduler module may be connected to an input device, for example, a distinct computer in the network which is in communication with the processing units (processing computers or other devices) in the network. The input device receives information from a human operator and transmits commands to the scheduler module so that the scheduler module sends the configuration information to the processing units.

Although each of the plurality of processing units has its own assigned part of the data stream, each processing unit monitors or observes the complete data stream at any instance in time. However, parts of the data stream that are not to be processed by a certain processing unit are ignored by this particular processing unit. Once a part of the data stream that is to be processed by a particular processing unit is conducted via the first common transmission element, this processing unit selects, i.e., reads, this part of the data stream and performs corresponding processing operations on this part of the data stream. The corresponding parts of the data stream may also be stored in a buffer of the respective processing unit and processed afterwards. However, a large main memory which stores the complete data contained in the data stream is not necessary, since every processing unit has access to the complete data stream while the data stream is transmitted via the common transmission element but accesses only the parts of the data stream that are to be processed by the respective processing unit. In particular, multiple processing units may also process overlapping parts of the data stream without the need to read out the corresponding (overlapping) data multiple times from a shared main memory. Therefore, the need for multiple accesses on a shared main memory is eliminated altogether and the computational overhead is reduced.

According to an embodiment, the scheduler module is configured to assign the parts of the first data stream to the processing units by communicating parameters indicative of the parts of the first data stream to each of the processing units.

Such parameters, for example, may be parameters indicative of a start and end of a window of interest in the data stream. In image processing applications, for example, a start pixel and an end pixel of a region within an image may be communicated to each of the plurality of processing units, so that every processing unit processes only the assigned region of the image. Another conceivable parameter would be time based, so that each processing unit accepts parts of the data stream at certain times when the data stream is broadcast to the processing units. However, this enumeration is only exemplary in nature and every parameter may be used that allows each of the plurality of processing units to identify an assigned part of the data stream.

The parameters may differ for each of the processing units, such that every part of the data stream is only processed by a distinct one of the plurality of processing units. However, it is also conceivable that two or more processing units get the same parameters. This may, for example, be useful in some cases to add redundancy to the processing operations.

According to a further embodiment, the parameters include an ignore preamble. The ignore preamble indicates an amount of data at the beginning of a data stream to be ignored by the processing unit to which the ignore preamble is communicated.

For example, the ignore preamble may indicate an amount of data bits or pixels (in image processing applications) that should not be considered by a corresponding one of the processing units. Therefore, the ignore preamble may be a threshold value for a counter of the processing unit. The processing units may, for example, continuously count an amount of data bits or pixels and may start to accept parts of the data stream once the corresponding counter has reached this threshold value.

In this embodiment and in any other aspect or embodiment described herein, the data stream may be of a predetermined and known format when it is transmitted via the common data transmission element. Based on this predetermined format, the ignore preamble and the assigned area of an image can be identified in the data stream.

For example, in video stream applications, the ignore preamble may specify a number of pixels at the beginning of each frame of the video to be ignored. The corresponding processing unit may then ignore this number of pixels at the beginning of the frame (and, i.e., at the beginning of the data stream that corresponds to a frame) and start reading and processing the frame once this number of pixels has passed. The processing unit may then, e.g., process the remaining pixels until the end of the frame and restart the counter, so that the same number of pixels is ignored in the next frame of the video stream. In this way, it is possible to have every processing unit process the same part of each frame of the video. One concrete example would be that two processor cores are used to process a video stream in parallel, wherein each processing unit is configured to process one half of each video frame. The video stream may, for example, be streamed by transmitting (via the first common data transmission element) pixel after pixel consecutively line for line of the frames, so that the pixels of the first line of the frame are transmitted first from left to right. After that, the pixels of the second line of the frame are transmitted from left to right, and so on. Once all the pixels of a single frame are transmitted, the next frame is transmitted in the same way. If, for example, a first processing unit should process the upper part of the frames and a second processing unit should process the lower part of the frames, and the video frames comprise a total amount of N pixels, the ignore preamble for the first processing unit would be 0 and the ignore preamble for the second processing unit would be N/2. However, this is only one example to illustrate the meaning of the ignore preamble. The ignore preamble may be any parameter that allows the processing units to determine an amount of data at the beginning of a data stream or at the beginning of a repeating part of a data stream (such as frames in a video stream) that is to be ignored and not to be processed by the processing unit. In other words, the ignore preamble defines an offset value for each processing unit, and the offset value indicates at which position in the data stream the responsibility of the respective processing unit starts.

According to a further embodiment, the parameters include an accept parameter and an ignore parameter. The accept parameter indicates an amount of data to be selected by the processing unit to which the accept parameter is communicated and the ignore parameter indicates an amount of data to be ignored by the processing unit to which the ignore parameter is communicated.

The accept parameter therefore may indicate an amount of data to be processed by any of the processing units. The ignore parameter may indicate an amount of data that is to be ignored by the corresponding processing unit once the part of the first data stream defined by the accept parameter has passed. Further, if an ignore preamble is used, the accept parameter may indicate an amount of data that is to be processed by the processing unit, once the data corresponding to the ignore preamble has passed. The accept parameter and the ignore parameter may also, just like the ignore preamble, be threshold values for corresponding counters of the processing units. Therefore, if, for example, a consecutive number of data bits in the first data stream is to be processed by any of the processing units, a corresponding ignore preamble may indicate the segment or part of the stream that is to be ignored until the part of the stream arrives that is to be processed by the corresponding processing unit. The processing unit may then read the amount of data indicated by the accept parameter and afterwards ignore the amount of data indicated by the ignore parameter. In this way, it is possible to distribute portions of a data stream to multiple processing units for processing without the need to store the complete data in a shared main memory.

According to an embodiment, each of the processing units is configured to periodically access data defined by the accept parameter and to periodically ignore data defined by the ignore parameter.

Each of the plurality of processing units may therefore periodically process a certain amount of data indicated by the accept parameter and periodically ignore an amount of data indicated by the ignore parameter. In other words, accept and ignore may periodically and alternatingly repeat. This may take place until each processing unit has processed a certain amount of data, which may be predefined or also, in addition to the ignore preamble, the accept parameter and the ignore parameter, communicated to the processing units by the scheduler module.

For example, when processing a video stream in which every processing unit should process a distinct part of each frame of the video, accept and ignore may periodically repeat. Following the example from above, an ignore preamble may again specify a number of pixels at the beginning of each frame of the video to be ignored. The corresponding processing unit may then ignore this number of pixels at the beginning of the frame and start processing the frame once this number of pixels has passed. The processing unit may then periodically process and ignore the remaining pixels until the corresponding processing unit has processed a certain amount of data and restart the counter for the ignore preamble when the end of the frame is reached, so that the same number of pixels is ignored at the beginning of the next frame of the video stream. In this way, it is possible to have every processing unit process the same part of each frame of the video.

The accept parameter and the ignore parameter are particularly useful when an image or a frame of a video sequence is transmitted so that the horizontal rows of the image or frame are transmitted sequentially but a certain processing unit is not assigned the entire row but only a part of each row for multiple rows.

One concrete example would be that four processing units (such as four processor cores) are used to process a video stream in parallel, wherein each processing unit should process one fourth of each video frame. The video stream may, for example, be streamed by transmitting (via the first common data transmission element) pixel after pixel consecutively line (i.e., horizontal row) for line of the frames, so that the pixels of the first line of the frame are transmitted first from left to right. After that, the pixels of the second line of the frame are transmitted from left to right, and so on. Once all the pixels of a single frame are transmitted, the next frame is transmitted in the same way. If, for example, a first processing unit should process the upper left part of each frame, a second processing unit should process the upper right part of each frame, a third processing unit should process the lower left part of each frame, and a fourth processing unit should process the lower right part of each frame, and the video frames comprise a total amount of N×M pixels (wherein N defines the width of the frames and M defines the height of the frames), the ignore preamble for the first processing unit would be 0, the ignore preamble for the second processing unit would be N/2, the ignore preamble for the third processing unit would be N×M/2 and the ignore preamble for the fourth processing unit would be N×M/2+N/2. The accept parameter for each of the processing units would be N/2 and the ignore parameter for each of the processing units would also be N/2. Further the total amount of data to be processed by each processing unit during one frame of the video stream would be (N×M)/4.

However, this is only one example to illustrate the meaning of the accept parameter and the ignore parameter. The parameters may be any parameter that allows the processing units to determine an amount of data to be periodically processed and ignored. In particular, the accept parameter and the ignore parameter does not need to be counters for pixels but may also, e.g., be counters for data bits or any other suitable parameters.

According to a further embodiment, the processing units are configured to process image data.

According to a further embodiment, the processing units are configured to additionally select surrounding parts of the assigned parts of the first data stream of at least two processing units, so that regions of interest of at least two processing units overlap with each other.

Thereby, the regions of interest are the parts of the first data stream that are to be processed by the corresponding processing unit. The assigned parts of the first data stream for different processing units may comprise sharp edges, so that no part of the data stream is simultaneously assigned to more than one processing unit. However, for some processing operations it may be necessary for some or all of the processing units to consider data that surround the assigned parts. In other words, a processing unit is responsible for processing a certain part of the image or frame (i.e., this processing unit is assigned an area of the image/frame) but this processing unit may need to consider pixels from the adjacent parts of the image or frame to process the edge region of its assigned area. This may, for example, be necessary when identifying features in an image that are located on an edge of the assigned part of the corresponding image/data stream. However, this is only an example and other scenarios where knowledge of parts of the first data stream immediately adjacent to the assigned parts may be useful are conceivable, too.

According to a further embodiment, the processing device further comprises a second common data transmission element and a second input interface. The second input interface is configured to receive a continuous second data stream and to transmit the second data stream via the second common data transmission element. Each of the processing units is connected to the second common data transmission element and configured to receive data transmitted via the second common data transmission element. The scheduler module is configured to assign parts of the second data stream to the processing units for simultaneous processing. Each of the processing units is configured to perform combined processing operations on the parts of the first data stream and the second data stream.

In some cases, it may be necessary, to perform calculations or processing operations using data from two different data streams. This may for example be useful when performing matrix calculations with two matrices as inputs. The first data stream may then contain the matrix elements of the first matrix and the second data stream may contain the matrix elements of the second matrix. In such cases, the processing units may receive a second data stream from a second input interface via a second common data transmission element. The scheduler module may assign parts of the second data stream to individual processing units in the same way as described above for the first data stream. Each of the processing units may select the assigned parts of the first data stream and the second data stream either simultaneously or consecutively. In the latter case, the processing units may, for example, buffer the selected data from the first data stream and perform the corresponding processing operations once the second data stream is available.

Although described with reference to matrix calculations, many parallel computing applications where multiple inputs are necessary are conceivable. The application therefore is not limited to the illustratively described matrix calculations but any calculation or processing for two or more input streams may be performed with such a processing device. In particular, the processing device may in the same way comprise third, fourth, fifth, etc. common data transmission elements and input interfaces to enable parallel computing of more complex processing tasks.

The second common data transmission element, the second input interface and the second data stream may be configured in the same way as the corresponding first elements according to any of the embodiments described above.

According to a second aspect, a method for distributing data to a plurality of processing units is provided. The method comprises receiving a continuous first data stream and transmitting the first data stream via a first common transmission element. The method further comprises assigning parts of the first data stream to the processing units and monitoring the complete first data stream by each of the processing units. Further, the method comprises selecting, by each of the processing units, the parts of the first data stream assigned to the processing units and performing processing operations on the selected parts of the first data stream by the processing units.

The method comprises steps that correspond to the functions of the processing device and its components. Therefore, the details of these functions are not repeated here. However, the skilled person understands that the details provided with respect to the functions of the processing device and its components apply in a similar manner to the method steps without being repeated here.

According to an embodiment, assigning the parts of the first data stream to the processing units occurs by communicating parameters indicative of the parts of the first data stream to each of the processing units.

According to a further embodiment, the parameters include an ignore preamble and the ignore preamble indicates the amount of data at the beginning of a data stream to be ignored by the processing unit to which the ignore preamble is communicated.

According to a further embodiment, the parameters include an accept parameter and an ignore parameter. The accept parameter indicates an amount of data to be accessed by the processing unit to which the accept parameter is communicated. The ignore parameter indicates an amount of data to be ignored by the processing unit to which the ignore parameter is communicated.

According to a further embodiment, selecting the assigned parts of the first data stream comprises periodically accessing data defined by the periodic accept parameter and periodically ignoring data defined by the periodic ignore parameter.

According to a further embodiment, the selecting of the assigned parts of the first data stream by each of the processing units includes additionally selecting surrounding parts of the assigned parts by at least two processing units, so that regions of interest of at least these two processing units overlap with each other.

According to a further embodiment, the method further comprises receiving a continuous second data stream by a second input interface and transmitting the second data stream via a second common transmission element. The method further comprises assigning parts of the second data stream to the processing units and monitoring the complete second data stream by each of the processing units. Further, the method comprises selecting, by each of the processing units, the parts of the second data stream assigned to the processing units and performing combined processing operations on the selected parts of the first data stream and the second data stream by the processing units.

In summary, the disclosure provides a processing device and a method for distributing data to a plurality of processing units that can be used for a multitude of parallel computing applications. The device and method do not afford a common shared main memory for the processing units. Therefore, the amount of memory accesses and consequently computational overhead may be greatly reduced, and the performance of parallel computing operations may be enhanced. Although in some instances herein described with reference to image processing and matrix calculations, the processing device and method may be used for any parallel computing application.

BRIEF DESCRIPTION OF THE DRAWINGS

In the following, example embodiments are described in more detail having regard to the attached figures. The illustrations are schematic and not to scale. Identical reference signs refer to identical or similar elements.

FIG. 5 is a schematic representation of two input matrices used for calculating a matrix product using the processing device of FIG. 4.

FIG. 6 is a flow diagram of a method for distributing data to multiple processing units using the processing device of FIG. 1.

FIG. 7 is a flow diagram of an alternative method for distributing data to multiple processing units using the processing device of FIG. 4.

DETAILED DESCRIPTION

Figure 1:
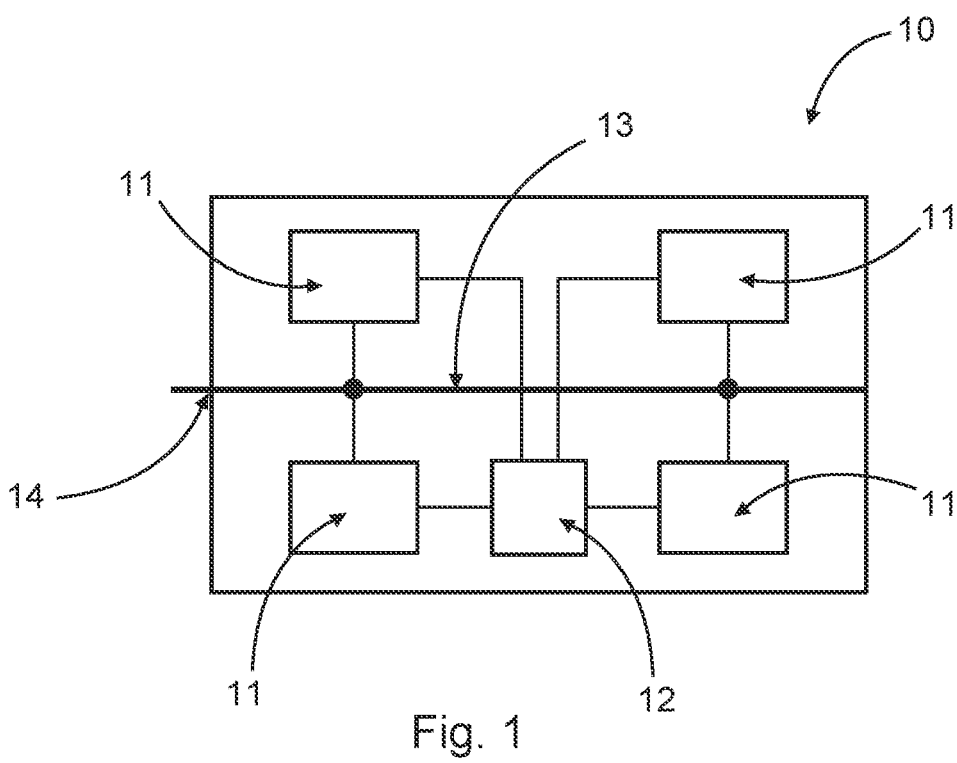
FIG. 1 is a schematic diagram of a single data stream processing device having four processing units.

FIG. 1 shows a processing device 10 for parallel computing. The processing device 10 comprises a plurality of processing units 11, in particular four processing units 11. A scheduler module 12 is in electronic communication with each of the processing unit 11. Each of the processing units 11 is connected to a first common data transmission element 13. A first input interface 14 is connected to the first common data transmission element 13. The processing device 10 may, for example be a network on chip (NoC), a CPU, a GPU or any other chip-based embedded processing device 10. The processing units 11 may, for example be processing cores of the chip-based embedded processing system (the processing device 10). However, non-chip-based processing devices 10 are also conceivable. The processing units 11 may, for example, be standard ethernet computers connected via a standard ethernet, which acts as common data transmission element 13.

A first data stream may be received by the first input interface 14, which in turn transmits or broadcasts the first data stream via the first common transmission element 13. Since each of the plurality of processing units 11 is connected to the common data transmission element 13, each of the plurality of processing units 11 always has access to the complete first data stream. However, the processing units 11 only read data from the first common data transmission element 13, without modifying the data on the first common transmission element 13. The first data stream may comprise any kind of data that is suitable for parallel computing by different processing units 11, such as image or video data, as described further below with reference to FIG. 2. For example, the first data stream may comprise video data, and each of the frames of the video can be transmitted pixel by pixel. For this, the pixels of the first line of the first frame of the video may be transmitted consecutively. Once the first line is finished, the pixels of the second line are transmitted in the same manner, and so on, until the first frame has been fully transmitted. After that, the second frame of the video is transmitted in the same manner, and so on, until the video stream is finished.

The scheduler module 12 distributes the workload to the different processing units 11 and is configured to assign certain parts of the first data stream for processing to the different processing units 11. This happens beforehand, e.g., by communicating parameters that are indicative of the parts of the first data stream to be processed by one of the processing units 11 to this processing unit 11. Such parameters may, for example, include an ignore preamble, an accept parameter, and an ignore parameter, as will be discussed with regard to FIG. 2.

Each of the processing units 11 continuously listens to or monitors the common data transmission element 13. Once the parts of the first data stream assigned to a particular processing unit 11 are transmitted via the first common data transmission element 13, the respective processing unit 11 selects (reads) this part of the data stream and processes the data. For example, each of the processing units 11 may be assigned a different part of the frames of a video which is to be processed by the corresponding processing device 11. Therefore, each of the processing units 11 may process different parts of the image or video data simultaneously, without the need to save the complete data in a shared main memory. Therefore, accessing of such main memory is avoided altogether, thereby reducing computational overhead and enhancing computational performance.

Although described with regard to image processing, the processing device 10 may be used for processing any large data in parallel by the processing units 11.

Figure 2:
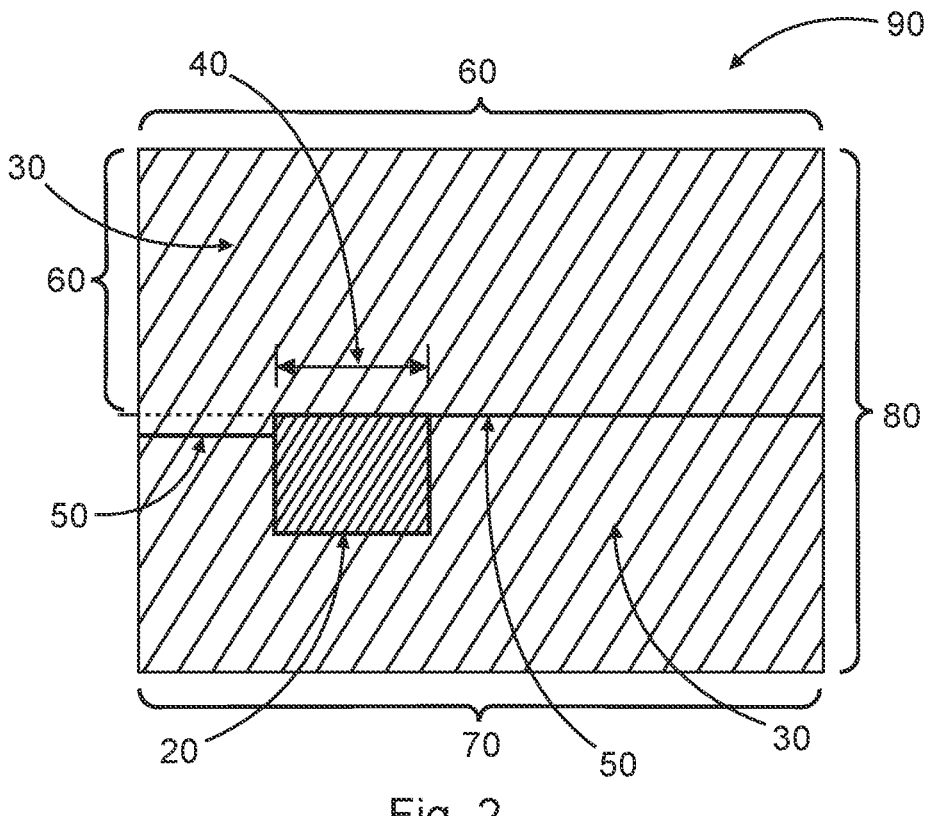
FIG. 2 is a schematic representation of an image to be processed by the processing device of FIG. 1.

FIG. 2 shows an example of a picture or a frame 90 of a video to be processed by the processing device of FIG. 1. Without loss of generality, the situation depicted in FIG. 2 will be described regarding anyone, for example a first, of the depicted processing units 11 of FIG. 1. A similar situation as depicted in FIG. 2 exists for the remaining processing units 11. The frame 90 comprises a region of interest 20, which corresponds to the parts of the data stream that are to be processed by the processing unit 11, and ignored parts 30, which are not processed by the processing unit 11. The processing device 10 of FIG. 1 uses an ignore preamble 60, an accept parameter 40 and an ignore parameter 50, which correspond to pixel counter threshold values. These values define the regions of interest 20 for the processing units 11 and are send by the scheduler module 12 to the processing units 11. The ignore preamble 60 corresponds to an amount of data that is ignored by the processing device 11 at the beginning of a stream or, as depicted, of a frame within the video stream. The ignore preamble 60 is indicated in FIG. 2 by curly brackets on top of the frame 90 and on the left side of the frame 90. It corresponds to the number of pixels contained in the area covered by these brackets. The accept parameter 40 is indicated by a double arrow above the region of interest 20. It corresponds to the number of pixels in one line of the frame and within the region of interest 20. The ignore parameter 50 is indicated by a line from the end of the first line of the region of interest 20 to the right end of the frame 90 and from the beginning of the second line of the frame 90 to the region of interest 20. It corresponds to the number of pixels that are transmitted within the data stream between the end of the first line of the region of interest 20 and the beginning of the second line of the region of interest 20 (since the frame data is transmitted pixel by pixel, line by line).

When a new frame is transmitted via the first common data transmission element 13, the processing unit 11 counts the transmitted pixels. When the threshold defined by the ignore preamble 60 is reached, the processing unit 11 starts an accept counter and captures pixels from the transmitted data stream until the accept counter reaches the threshold defined by the accept parameter 40. After this, the processing unit 11 stops capturing pixels from the data stream and starts and ignore counter. When the ignore counter reaches the threshold defined by the ignore parameter 50, the processing unit 11 again starts the accept counter and captures pixels form the data stream. This procedure alternatingly is repeated until the processing unit 11 captured a predefined amount of pixels corresponding to the amount of pixels within the region of interest 20. After this, the processing unit stops capturing pixels until the next frame arrives via the data stream and starts the counter for the ignore preamble again. The end of the frame may be detected, for example, by a corresponding flag within the data stream or by counting the overall pixels of the frame that have passed the data stream. The processing unit 11 may process the pixels within the region of interest 20 simultaneously while capturing them or may wait until the full region of interest has been captured and process them afterwards in the time until the region of interest 20 of the next frame 90 arrives.

Similar regions of interest 20 may exist for the remaining processing units 11, which may be placed at different locations within the frame 90. By appropriately setting the parameters (ignore preamble, accept parameter, ignore parameter), in principle any part of the data stream can be defined, as will be readily apparent to one of ordinary skill in the art. Therefore, each of the processing units 11 can process a certain area within frames 90 of a video stream which correspond to certain parts of the first data stream. Parallel processing of the data stream without the need to store the full data in a shared main memory may be achieved in this way.

Although as described for processing a video stream, the processing device 10 can in principle be used for parallel processing of any large continuous data stream.

Figure 3:
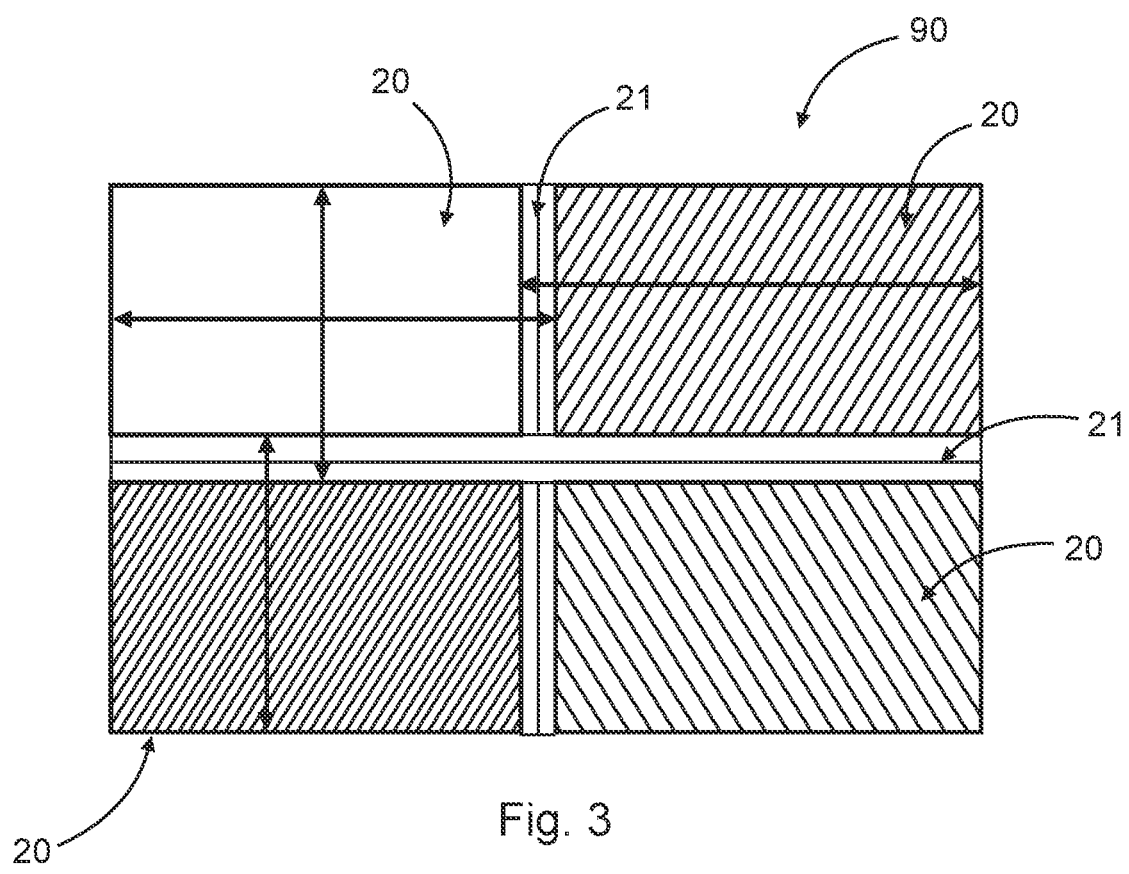
FIG. 3 is a schematic representation of a video frame with overlapping regions of interest.

Further, the processing units 11 may additionally select (capture) surrounding parts 21 of the regions of interest 20 that enlarge the parts of the first data stream that are processed by each of the processing units 11, as shown in FIG. 3. In image processing applications, this may for example be necessary in order to detect features at the edges of the regions of interest 20. By selecting additional surrounding regions 21, overlapping regions are processed by multiple processing units 11. In regular processing devices using a shared main memory, this would greatly increase memory accesses and therefore computational overhead. These memory accesses are avoided altogether by the disclosed processing device 10.

Figure 4:
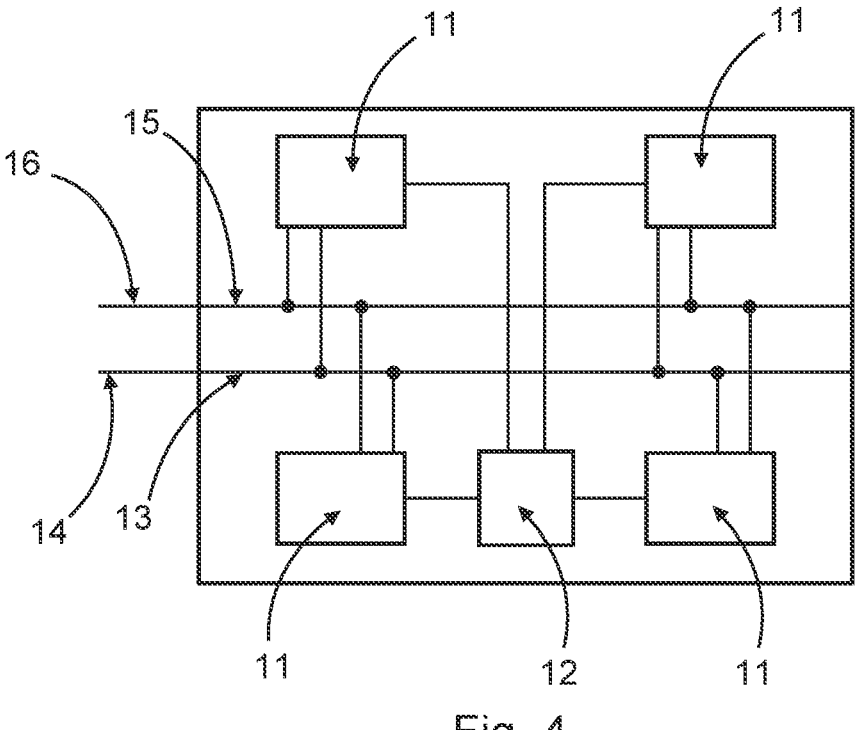
FIG. 4 is a schematic diagram of a dual data stream processing device having four processing units.

FIG. 4 shows another processing device 10 which differs from the processing device 10 shown in FIG. 1 in that it comprises a second input interface 16 and a second common data transmission element 15. Each of the processing units 11 is connected to both the first data transmission element 13 and the second data transmission element 15. The processing device 10 of FIG. 4 works in a similar manner as the processing device 10 of FIG. 1. However, a second data stream may be broadcast via the second data transmission element 15. The processing units 11 similarly monitor the second data stream and process parts of the second data stream in the same way as the parts of the first data stream. In particular, the processing units 11 may process the assigned parts of the first data stream and the second data stream independently of each other. For example, the processing units 11 may process parts of the second data stream, while they do not process data from the first data stream.

However, more importantly, the processing units 11 may perform combined calculations on the first data stream and the second data stream. In other words, the first data stream and the second data stream may provide multiple inputs for calculations. For example, the processing units 11 may compare pictures from the first data stream with pictures from the second data stream. This may, e.g., be useful to detect changes in a detected environment, for example from a camera, with regard to reference pictures or videos. Another scenario is to calculate matrix products of large matrices without the need to store the matrices and access them, as described with regard to FIG. 5.

FIG. 5 shows two matrices A and B which are to be multiplied with each other. Such a multiplication may occur in a similar manner as the processing of video data described with regard to FIG. 2, however, using the processing device of FIG. 4. The first matrix A, or rather the matrix elements of the first matrix A, are transmitted in the same way as the pixels of the frames in FIG. 2, element by element, line by line, in the first data stream via the first common data transmission element 13. The second matrix B may be transmitted in the second data stream via the second common data transmission element 15, but in this case element by element, column by column. Therefore, the ignore preamble 60 for matrix A is indicated on the top of the representation of matrix A. For matrix B, the ignore preamble 60 is indicated on the left of the drawing. In this way, the second data stream broadcasts the columns of matrix B to the processing units 11. The first data stream broadcasts the lines of matrix A to the processing units 11. The processing units 11 may use these matrix elements to calculate the results submatrix 95, which will be readily apparent to one of ordinary skill in the art. Each processing unit 11 can calculate a different results submatrix 95, enabling parallel computing of the complete results matrix.

Further, any other multi-input parallel computation may be performed by the processing device 10 of FIG. 4. It is also conceivable to add the necessary components for a third, fourth, fifth, etc. data stream, enabling parallel computations with a corresponding amount of inputs.

FIG. 6 shows a flow diagram of a method 100 for distributing data to multiple processing units 11. The method 100 starts with receiving a first data stream at the processing device 10 in step 101. The first data stream may be received at the first input interface 14 of the processing device.

In step 102, the first data stream is transmitted or broadcast via the first common transmission element 13, as described above with regard to the processing device 10. In step 103, parts of the first data stream are assigned to individual ones of the processing units 11. This assigning 103 may be performed by a scheduler module 12, as described with regard to the processing device 10, for example by communicating the corresponding parameters (ignore preamble, accept parameter, ignore parameter) to the corresponding processing units 11. In step 104, the processing units 11 monitor or observe the complete first data stream. This monitoring 104 may also be started before the data stream is received at the processing device 10. In step 105, the processing units 11 select the parts of the first data stream that have been assigned to the processing units 11. By selecting, reading the corresponding parts from the first data stream without manipulating the first data stream is meant. Finally, in step 106, each processing unit 11 performs the necessary processing operations on the corresponding parts of the first data stream and the method 100 ends.

Each method step may be performed according to the description with regard to the processing device 10 in FIG. 1.

FIG. 7 shows a flow diagram of another method 100 for distributing data to multiple processing units 11. This method 100 may, for example, be performed with the processing device 10 of FIG. 4. Method steps 101 to 105 correspond to method steps 101 to 105 of FIG. 6. Method steps 107 to 111 essentially mirror method steps 101 to 105, but with regard to a second data stream. Method step 106 of FIG. 6 is missing in the method 100 of FIG. 7. Instead, a combined computation or processing operation taking into account the data obtained from the first data stream and the second data stream in steps 105 and 111 is performed in step 112. Such a combined processing operation may, e.g., be a processing operation as described with regard to FIG. 5. Although as shown being performed simultaneously, method steps 101 to 105 and 107 to 111 may also be performed consecutively, depending on the requirements of the application.

The subject matter disclosed herein can be implemented in or with software in combination with hardware and/or firmware. For example, the subject matter described herein can be implemented in or with software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. Reference signs in the claims are not to be regarded as limitation. This disclosure hereby incorporates by reference the complete disclosure of any patent or application from which it claims benefit or priority.

LIST OF REFERENCE SIGNS

10 processing device
11 processing units
12 scheduler module
13 first common data transmission element
14 first input interface
15 second common data transmission element
16 second input interface
20 region of interest
21 surrounding parts
30 ignored parts of the data stream
40 accept parameter
50 ignore parameter
60 ignore preamble
70 image width
80 image height
90 picture, frame
A matrix
B matrix
95 results submatrix
100 method
101 receiving the first data stream
102 transmitting the first data stream
103 assigning parts of the first data stream
104 monitoring the first data stream
105 selecting parts of the first data stream
106 performing processing operations
107 receiving the second data stream
108 transmitting the second data stream
109 assigning parts of the second data stream
110 monitoring the second data stream
111 selecting parts of the second data stream
112 performing combined processing operation

The invention claimed is:

1. A processing device for parallel computing, comprising:

a plurality of processing units;

a scheduler module comprising first circuitry;

a first common data transmission element comprising second circuitry; and a first input interface;

wherein the first input interface is configured to receive a continuous first data stream and to transmit the first data stream via the first common transmission element;

wherein each of the processing units is connected to the first common transmission element and configured to receive data transmitted via the first common transmission element;

wherein the scheduler module is in electronic communication with each of the processing units;

wherein the scheduler module is configured to assign parts of the first data stream to each of the processing units for simultaneous processing; and wherein each of the processing units is configured to monitor all of the first data stream, to select the parts of the first data stream assigned by the scheduler module and to perform processing operations on the selected parts of the first data stream.

2. The processing device of claim 1, wherein the scheduler module is configured to assign the parts of the first data stream to the processing units by communicating parameters indicative of the parts of the first data stream to each of the processing units.

3. The processing device of claim 2, wherein the parameters include an ignore preamble; and wherein the ignore preamble indicates an amount of data at a beginning of a data stream to be ignored by the processing unit to which the ignore preamble is communicated.

4. The processing device of claim 2, wherein the parameters include an accept parameter and an ignore parameter;

wherein the accept parameter indicates an amount of data to be selected by the processing unit to which the accept parameter is communicated; and wherein the ignore parameter indicates an amount of data to be ignored by the processing units to which the ignore parameter is communicated.

5. The processing device of claim 4, wherein each of the processing units is configured to periodically access data defined by the accept parameter and to periodically ignore data defined by the ignore parameter.

6. The processing device of claim 1, wherein the processing units are configured to process image data.

7. The processing device of claim 1, wherein the processing units are configured to additionally select surrounding parts of the assigned parts of the first data stream of at least two processing units, so that regions of interest of at least two processing units overlap with each other.

8. The processing device of claim 1, comprising a second common data transmission element and a second input interface;

wherein the second input interface is configured to receive a continuous second data stream and to transmit the second data stream via the second common data transmission element;

wherein each of the processing units is connected to the second common data transmission element and configured to receive data transmitted via the second common data transmission element;

wherein the scheduler module is configured to assign parts of the second data stream to the processing units for simultaneous processing; and wherein each of the processing units is configured to perform combined processing operations on the parts of the first data stream and the second data stream.

9. A method for distributing data to a plurality of processing units, the method comprising:

receiving a continuous first data stream;

transmitting the first data stream via a first common transmission element, the first common transmission element comprising circuitry;

assigning parts of the first data stream to the processing units;

monitoring all of the first data stream by each of the processing units;

selecting, by each of the processing units, the parts of the first data stream assigned to the processing units; and performing processing operations on the selected parts of the first data stream by the processing units.

10. The method of claim 9, wherein assigning the parts of the first data stream to the processing units occurs by communicating parameters indicative of the parts of the first data stream to each of the processing units.

11. The method of claim 10, wherein the parameters include an ignore preamble; and wherein the ignore preamble indicates the amount of data at a beginning of a data stream to be ignored by the processing unit to which the ignore preamble is communicated.

12. The method of claim 10, wherein the parameters include an accept parameter and an ignore parameter;

wherein the accept parameter indicates an amount of data to be accessed by the processing unit to which the accept parameter is communicated; and wherein the ignore parameter indicates an amount of data to be ignored by the processing unit to which the ignore parameter is communicated.

13. The method of claim 12, wherein selecting the assigned parts of the first data stream comprises periodically accessing data defined by a periodic accept parameter and periodically ignoring data defined by a periodic ignore parameter.

14. The method of claim 9, wherein the selecting of the assigned parts of the first data stream by each of the processing units includes additionally selecting surrounding parts of the assigned parts by at least two processing units, so that regions of interest of at least these two processing units overlap with each other.

15. The method of claim 9, comprising:

receiving a continuous second data stream by a second input interface;

transmitting the second data stream via a second common transmission element;

assigning parts of the second data stream to the processing units;

monitoring all of the second data stream by each of the processing units;

selecting, by each of the processing units, the parts of the second data stream assigned to the processing units; and performing combined processing operations on the selected parts of the first data stream and the second data stream by the processing units.

* * * * *